United States Patent Office 3,358,009
Patented Dec. 12, 1967

3,358,009
PROCESS FOR PREPARING MIXED CYCLIC ORGANOSILOXANES
George M. Omietanski, Tonawanda, and Thomas C. Williams, Lancaster, N.Y., assignors to Union Carbide Corporation, a corporation of New York
No Drawing. Filed Apr. 29, 1963, Ser. No. 276,173
9 Claims. (Cl. 260—448.2)

The invention relates to a process for preparing cyclic organosiloxanes of specified desired composition having mixed organo-substituents. More particularly, it relates to a process of preparing cyclic organosiloxanes having mixed organo-substituents by reacting in the presence of an inert solvent an organosilicon diol compound with a trifunctional organosilicon compound containing an organo-substituent different from the organo-substituents of the diol compound.

Organosiloxanes having mixed organo-substituents and especially cyclic organosiloxanes containing mixed organo-substituents have been known in the art, but it was difficult to obtain such compounds having specific desired compositions in useful quantities. The preparation procedures for such compounds, as llustrated by the reaction between an alkoxy-endblocked polysiloxane and a silane diol, were extremely slow in reaction rates with attendant low yields. If catalysts were employed to increase the reaction rate, such catalysts would cause rearrangement of the organosilicon molecules and thus reduce the yield of desired products.

We have now found that cyclic organosiloxanes of specific desired composition having mixed organo-substituents can be conveniently prepared by reacting in the presence of an inert solvent an organosiloxane diol compound with an organosilane compound containing an organo-substituent different from the organo-substituents of the diol compound and also containing three monovalent radicals attached to silicon selected from the class consisting of chloro and alkylamino radicals.

More particularly, the novel process of the present invention comprises reacting in the presence of an inert solvent an organosiloxane diol having the formula $$HO(R_2SiO)_nH$$

with an organosilane compound having the formula $R^1SiX_3$, wherein R and $R^1$ are selected from the class consisting of monovalent hydrocarbyl radicals connected to silicon through a carbon-silicon bond and monovalent substituted hydrocarbyl radicals containing substituents free of active hydrogen, said monovalent substituted hydrocarbyl radicals connected to silicon through a carbon-silicon bond and having the substituents located at least two carbon atoms from the silicon atom and wherein R and $R^1$ are different radicals, n is an integer having a value from 2 to 4 inclusive, and X is a monovalent radical selected from the class consisting of chloro and alkylamino radicals, and recovering the desired cyclic organosilicon product.

The monovalent hydrocarbyl radicals which constitute R and $R^1$ in the above formulas are illustrated by alkyl groups, such as methyl, ethyl, propyl, isopropyl, butyl, isobutyl, amyl, hexyl and the like; alkenyl groups, such as vinyl, alkyl and the like; alicyclic groups, such as cyclopentyl, cyclohexyl and the like; aryl groups, such as phenyl naphthyl and the like; aralkyl groups, such as benzyl, phenylethyl and the like; and alkaryl groups, such as tolyl, ethylphenyl, xylyl, mesityl and the like.

The monovalent substituted hydrocarbyl radicals containing substituents free of active hydrogen wherein the substituents are located at least two carbon atoms from the silicon atom which constitute R and $R^1$ in the above formulas are illustrated by substituted alkyl groups, such as beta-cyanoethyl, gamma-cyanopropyl, delta-nitrobutyl, and the like; substituted alkenyl groups, such as 3-cyano-2-propenyl, 4-nitro-2-butenyl, and the like; substituted aryl groups, such as ortho-cyanophenyl, meta-nitrophenyl and the like; substituted alicyclic groups, such as 2-cyanocyclopentyl, 3-nitrocyclohexyl, and the like; substituted aralkyl groups, such as ortho-cyanobenzyl, meta-nitrophenylethyl and the like; and substituted alkaryl groups, such as beta-cyanoethylphenyl, ortho-nitrotolyl, and the like. Further examples of useful substituents free of active hydrogen are tertiary-amino, alkyl-ester and alkoxy-alkyl groups.

The alkylamino radicals which constitute X in the formula $R^1SiX_3$ are illustrated by diethylamino, methylpropylamino and the like.

The $HO(R_2SiO)_nH$ type compounds and $R^1SiX_3$ type compounds employed in the process of this invention can be prepared by well known techniques. The $$HO(R_2SiO)_nH$$

type compounds can be prepared by careful hydrolysis of chlorosiloxanes having the formula $Cl(R_2SiO)_{n-1}SiR_2Cl$ wherein R and n are as defined above. Compounds of the type $R^1SiX_3$ wherein X are chloro radicals can be prepared by reaction between organochlorides and silicon. $R^1SiX_3$ type compounds wherein X is alkylamino can be prepared by reaction of $R^1SiCl_3$ with excess amine.

The overall process of the present invention can be further described by reference to the following equation which illustrates the reaction between an organosiloxane diol and a trifunctional organosilane:

$$R^1SiX_3 + HO(R_2SiO)_nH \rightarrow [R^1(X)SiO](R_2SiO)_n + 2HX$$

The product from this reaction is a cyclic organosiloxane containing mixed organo-substituents as well as an X radical attached to silicon. It is understood that varying the stoichiometric ratio of reactants in the above equaton can produce other side products. It is preferred to use the molar amounts of reactants as shown above.

Whenever a chlorosilane is employed in the process of the present invention, hydrogen chloride will be formed. It is necessary to remove the HCl as soon as possible in order to prevent undesirable side reactions such as condensation of the siloxane diol to higher molecular weight polymers. An HCl acceptor, such as triethylamine, is preferably used to react with the HCl and thus promote the primary desired reaction. Other HCl acceptors could alternatively be used as long as they do not promote undesirable side reactions.

Where the use of HCl acceptors is not desirable, the process can be performed under conditions which minimize solubility of hydrogen chloride in the reaction medium. This can be accomplished, for example, by operating at the boiling point of the reaction system or by blowing an inert gas, such as dry nitrogen, through the reaction system. The use of a reaction solvent, such as carbon tetrachloride, in which HCl has a low solubility can also be beneficial toward maintaining satisfactory yield of desired products.

An organic solvent is necessarily employed in the process of the present invention. When an amine HCl acceptor is employed in this process, a solvent helps maintain a desirably low viscosity of the reaction mixture by counteracting the thickening effect of the precipitated amine hydrochloride. Examples of useful solvents are acetone, benzene, xylene, carbon tetrachloride, tetrahydrofuran and even an excess of the amine HCl acceptor, but other known solvents for organosilicon compounds could also be employed. The solvent must be such that both reactants are soluble in it and that it is inert to the reactants and products. The solvent can be present in any desired amount. It is preferred that the solvent be present in a volume amount of from about 25 to about 80 volume percent based on total volume of solvent plus reactants.

The reaction conditions for carrying out the process of this invention are not narrowly critical. The reaction temperature can be carried out at temperatures from below about 0° C. to about 200° C. The upper temperature limit of the reaction is, in general, the reflux temperature of the reactants-solvent-acid acceptor mixture. The preferred temperature range for the reaction is from about 0° C. to about 150° C. This process can be conveniently carried out at atmospheric pressure. However, in some instances, especially when low boiling reactants or low boiling solvents are used, the process can be run with advantage at pressures higher than atmospheric. A tertiary amine promoted reaction between a siloxane diol and a chlorosilane is very rapid. The highly exothermic reaction takes place at 20° C. about as fast as the reactants can be brought together.

Mixed cyclic organosiloxanes derived by the process of the present invention are useful for preparing higher polymers, particularly organosilicon gumstocks. This is especially true for mixed cyclic tetramers containing dimethyl substitution and other organo substitution. Because of their high dimethylsiloxane content, they are frequently liquids or low melting solids which are completely miscible with cyclic dimethylsiloxane tetramer at or near room temperature. These mixtures of mixed cyclic tetramers and cyclic dimethylsiloxane tetramer produce gumstocks of consistently superior processing quality as compared to gumstocks prepared by equilibration or mixing, for example, of cyclic dimethylsiloxane tetramer and a cyclic siloxane tetramer containing only the other organo radicals. The mixed cyclic tetramers produced by the process of this invention can thus be widely used to introduce groups such as beta-phenylethyl, beta-phenylpropyl, gamma-cyano-gamma-methylbutyl, nitrophenyl and the like into copolymer gumstocks.

The mixed cyclic organosiloxane tetramers, for example, produced by the process of the present invention can be polymerized by themselves by well known techniques to form high molecular weight organosilicon gumstocks. This is very useful for producing compositions containing organofunctional groups which are otherwise difficult to obtain in a form suitable for polymerization.

The process of the present invention will be further described by reference to the following example in which the expression "Me" signifies the methyl radical "$CH_3$" and the expression "$\phi$" signifies the phenyl radical "$C_6H_5$."

EXAMPLE

In a 2-liter, 3-necked flask equipped with a stirrer, a means of maintaining a dry atmosphere and two 500 ml. addition funnels was placed 300 ml. of benzene. A solution of 94 grams (0.39 moles) of $HO(Me_2SiO)_3H$ in 380 ml. of benzene was added to the flask simultaneously together with a solution of 83 grams (0.39 moles) of $\phi SiCl_3$ and 79 grams (0.782 moles) of triethylamine in 200 ml. of benzene with rapid stirring. The time of addition was 2 hours. After standing for 4 hours, the reaction mixture was filtered, the filtrate was stripped of benzene and the residue was fractionally distilled. There was obtained 72 grams (48 mole percent yield based on moles of reactants used) of a cyclic tetramer having the formula $[\phi(Cl)SiO](Me_2SiO)_3$ and having the properties of B.P.=119–120° C./4.5 mm. mercury and $n_D{}^{25}$=1.4551. Calculated for $C_{12}H_{23}ClSi_4O_4$: C, 38.07%; H, 6.1%; Si, 29.6%; Cl, 9.35%. Found: C, 38.0%; H, 5.8%; Si, 29.1%; Cl, 9.0%.

About 61 grams of the above material was dissolved in 200 ml. of benzene and mixed at ambient temperature with 50 ml. of distilled water. Then concentrated ammonium hydroxide was added to this mixture until the solution was premanently basic to brom-cresol-purple indicator. The benzene layer was washed to neutrality, dried over anhydrous calcium sulfate, stripped of benzene and the residue was distilled under vacuum. There was obtained 45 grams (73 mole percent yield based on moles of reactants used) of a cyclic tetramer having the formula $\phi(OH)SiO(Me_2SiO)_3$ and having the properties of B.P.=93–95° C./0.2 mm. mercury, $n_D$=1.4560 and $d_{25°}$=1.078. Calculated for $C_{12}H_{24}Si_4O_5$: C, 40.0%; H, 6.7%; Si, 31.2%; OH, 4.7%. Molecular weight=362, $MR_D$=90.3. Found: C, 40.3%; H, 6.7%; Si, 31.4%; OH, 4.6%. Molecular weight=360, $MR_D$=91.1.

The above example employed an organotrisiloxane as one of the reactants. This resulted in a cyclic tetramer organosiloxane product. This invention is also applicable to the use of organodisiloxanes to produce cyclic trimer products and to the use of organotetrasiloxanes to produce cyclic pentamer products.

What is claimed is:

1. A process for the production of cyclic organosiloxanes of specific desired composition having mixed organo-substituents which comprises reacting in the presence of an inert solvent an organosiloxane diol having the formula $HO(R_2SiO)_nH$ with an organosilane compound in an amount sufficient to react with all of the organosiloxane diol present, said organosilane compound having the formula $R^1SiCl_3$ wherein R and $R^1$ are selected from the class consisting of monovalent hydrocarbyl radicals connected to silicon through a carbon-silicon bond and monovalent substituted hydrocarbyl radicals being selected from the class consisting of substituted alkyl groups, substituted alkenyl groups, substituted aryl groups, substituted alicyclic groups, substituted aralkyl groups, and substituted alkaryl groups and containing substituents free of active hydrogen, said monovalent substituted hydrocarbyl radicals connected to silicon through a carbon-silicon bond and having the substituents located at least two carbon atoms from the silicon atom and wherein R and $R^1$ are different radicals, $n$ is an integer having a value from 2 to 4 inclusive, and recovering the desired cyclic organosilicon product.

2. A process for the production of cyclic organosiloxanes having mixed organo-substituents as set forth in claim 1 wherein the solvent is present in an amount from about 25 to about 80 volume percent based on total volume of solvent plus reactants.

3. A process for the production of cyclic organosiloxanes having mixed organo-substituents as set forth in claim 1 wherein the solvent is selected from the class consisting of acetone, benzene, xylene and tetrahydrofuran.

4. A process for the production of cyclic organosiloxanes having mixed organo-substituents as set forth in claim 1 wherein the process is carried out at a temperature below about 200° C.

5. A process for the production of cyclic organosiloxanes having mixed organo-substituents as set forth in claim 1 wherein the process is carried out at a temperature of about 0° C. to about 150° C.

6. A process for the production of cyclic organosiloxanes having mixed organo-substituents as set forth in claim 1 wherein the reaction is carried out in the presence of an HCl acceptor.

7. A process for the production of cyclic organosiloxanes having mixed organo-substituents as set forth in claim 6 wherein the HCl acceptor is triethylamine.

8. A process for the production of a cyclic organosiloxane having the formula:

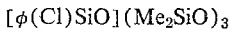

which comprises reacting in the presence of an inert solvent and in the presence of an HCl acceptor phenyltrichlorosilane and dimethylsiloxane trimer diol in a molar ratio of 1 to 1 and recovering the desired cyclic organosiloxane product.

9. A process for the production of a cyclic organosiloxane having the formula:

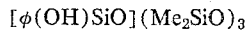

which comprises reacting in the presence of an inert solvent and in the presence of an HCl acceptor phenyltrichlorosilane and dimethylsiloxane trimer diol in a molar ratio of 1 to 1 to form an intermediate product, hydrolyzing the intermediate product, and recovering the desired cyclic organosiloxane product.

References Cited

UNITED STATES PATENTS

| | | | |
|---|---|---|---|
| 3,268,570 | 8/1966 | Weyenberg | 260—448.2 |
| 3,133,110 | 5/1964 | Morehouse et al. | 260—448.2 |
| 2,684,379 | 7/1954 | Guillissen et al. | 260—448.2 |
| 3,037,962 | 6/1962 | Hartung et al. | 260—448.2 |

OTHER REFERENCES

Pike, "Jour. Org. Chem.," vol. 26, January 1961, pages 232–236.

TOBIAS E. LEVOW, *Primary Examiner.*

SAMUEL H. BLECH, HELEN M. McCARTHY,
*Examiners.*

P. F. SHAVER, *Assistant Examiner.*